United States Patent [19]
Lin

[11] Patent Number: 6,162,092
[45] Date of Patent: Dec. 19, 2000

[54] SAFETY FIXING STRUCTURE OF AN EXTENSION CORD FOR ARTIFICIAL CHRISTMAS TREE

[76] Inventor: Fong Shi Lin, No. 196, Chin Long Road, Hsio Chin Ko Chang, Hwei Chou City, Kaunton, China

[21] Appl. No.: 09/353,015

[22] Filed: Jul. 13, 1999

[51] Int. Cl.[7] .................................................. H01R 13/66
[52] U.S. Cl. .......................................... 439/574; 439/575
[58] Field of Search .................................. 439/527, 574, 439/575; 248/214

[56] References Cited

U.S. PATENT DOCUMENTS 5,472,157  12/1995  Lehrman ................................. 439/574
6,036,538  3/2000  Lin ......................................... 439/574
6,080,014  6/2000  Steiler .................................... 439/574

*Primary Examiner*—Khiem Nguyen
*Attorney, Agent, or Firm*—Rosenberg, Klein & Lee

[57] ABSTRACT

The present invention relates to a safety fixing structure for an extension cord of artificial Christmas tree, which mainly includes a fixing seat, a socket capable of clip-assembling the extension cord, and let every open holes of the socket be outwardly exposes. One side of the fixing seat is mounted with a connecting portion and mounted with connecting holes, such that the fixing seat along with the socket are simply and easily to be attached to the trunk of the artificial Christmas tree and hard to be fallen off. Each inserting hole of the socket can be under inclined status to benefit the clip-assembling and electric conducting of a plug of the lamp string. Thus, It is full with practical values.

1 Claim, 4 Drawing Sheets

SAFETY FIXING STRUCTURE OF AN EXTENSION CORD FOR ARTIFICIAL CHRISTMAS TREE

BACKGROUND OF THE INVENTION

Conventionally, it uses a winding hanging of lamp strings to fit with artificial Christmas tree for the decoration purpose. In order to provide a simultaneous conducting connection of multiple sets of lamp strings and random arrangements of the artificial Christmas, ordinary extension cords are currently used to fit with. By using a rope or other means, the socket of the extension cord is directly tied to the trunk. This conventional type of fixing way is weak in fixing strength, and generally shows the bad phenomena of loosening. The insert holes in the socket parallel or vertical with the trunk are limited owing to the obstacles of tree branch, and the operating procedures for aiming the plugs of lamp strings to insert holes of the sockets are very difficult. Especially for insert holes of the top edge of the sockets, due to their vertical upward direction, further causes that it is difficult to smoothly finish the assembly between the plug and socket. Thus, it has a great deal to be improved.

OBJECT OF THE INVENTION

Owing to this, the present invention mainly is to provide a safety fixing structure of an extension cord for artificial Christmas tree, which fits with a connection of the fixing seat to simply, easily and firmly to be assembled on the trunk, and let the socket be shown as inclined extension such that it is beneficial to the easy and simple inserting fit of each plug of the lamp string, and finish the conducting connection.

BRIEF DESCRIPTION OF THE DRAWINGS

Now, by fitting with the drawings, the features and effects of the present invention are described as following.

DETAILED DESCRIPTION OF THE INVENTION

Figure 1:
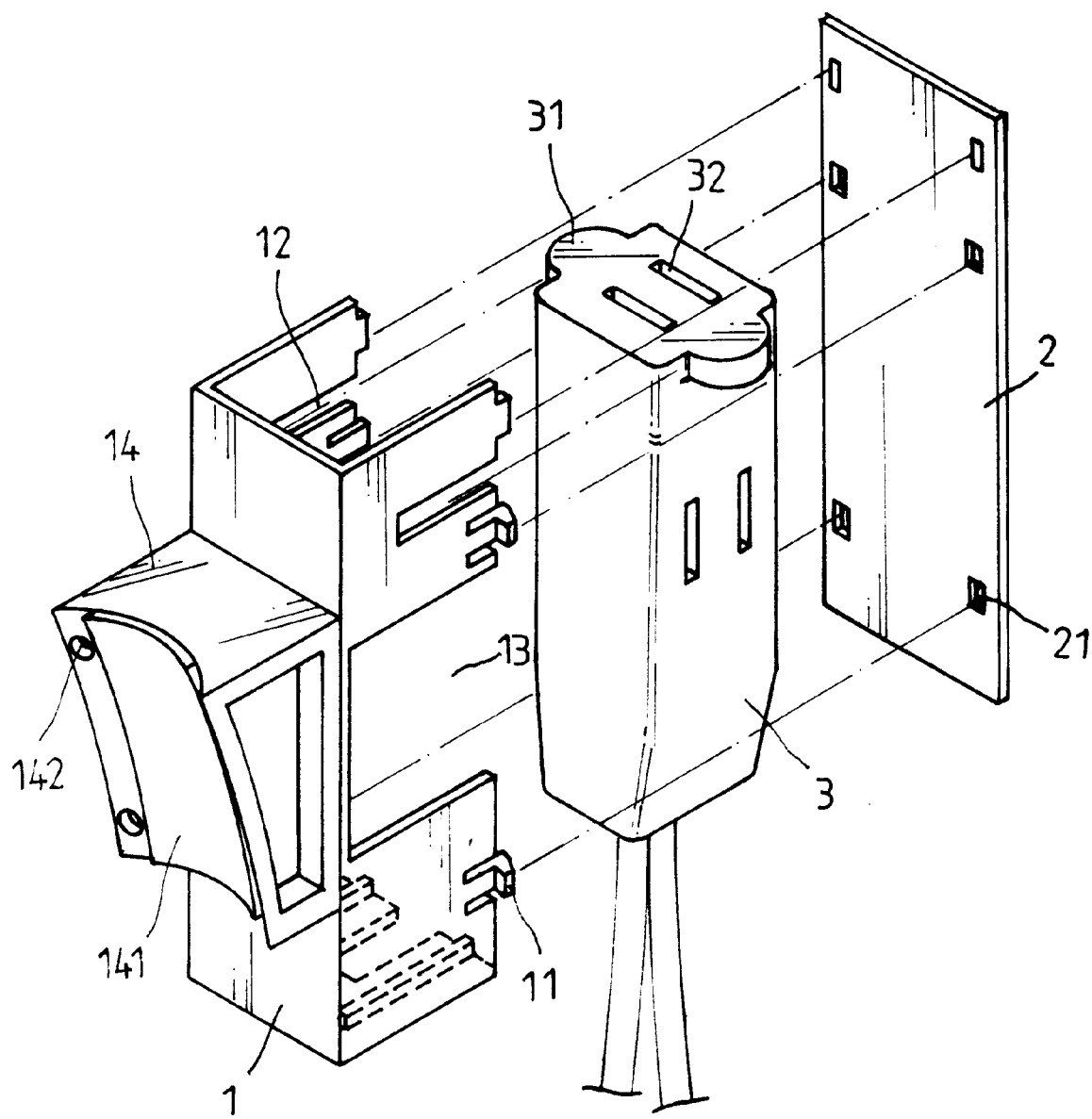
FIG. 1 is an exploded three dimensional diagram of the present invention.
Figure 2:
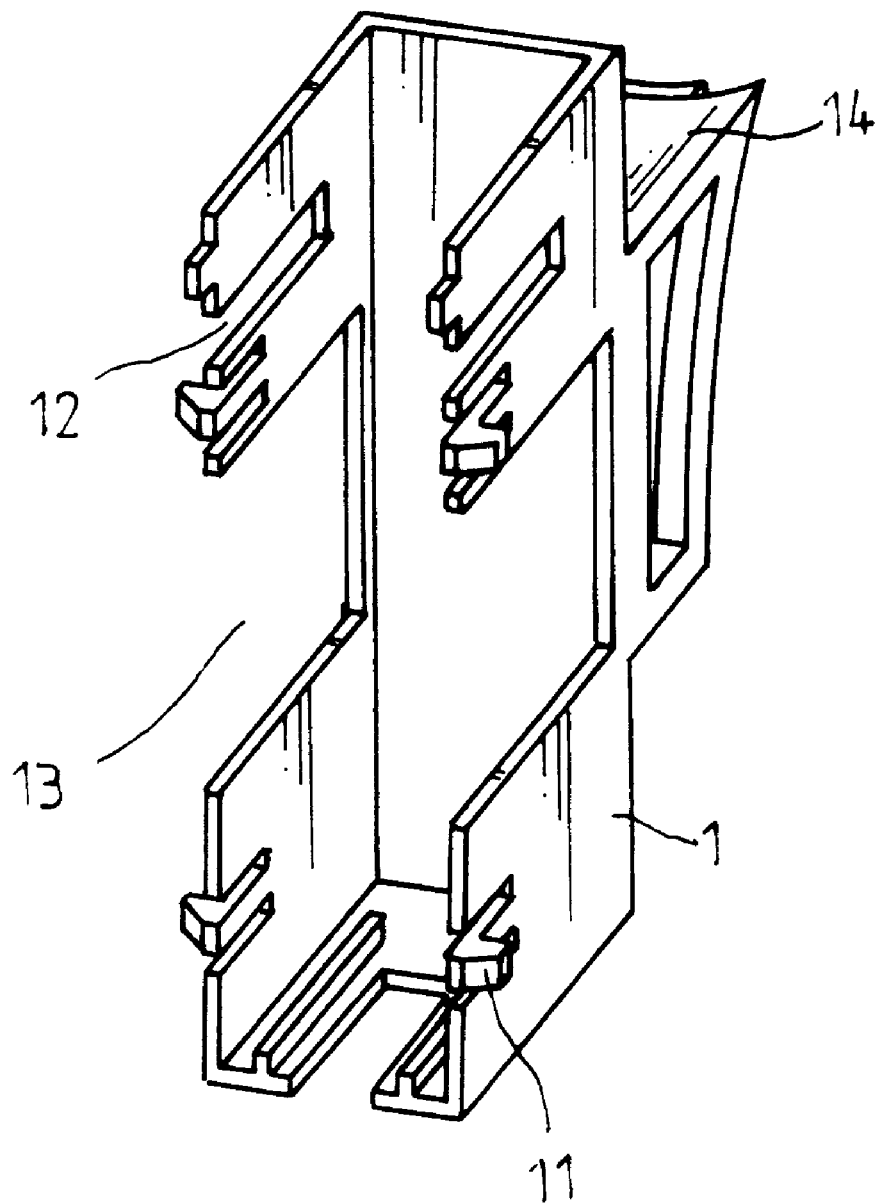
FIG. 2 is a three dimensional diagram of a fixing seat of the present invention.
Figure 3:
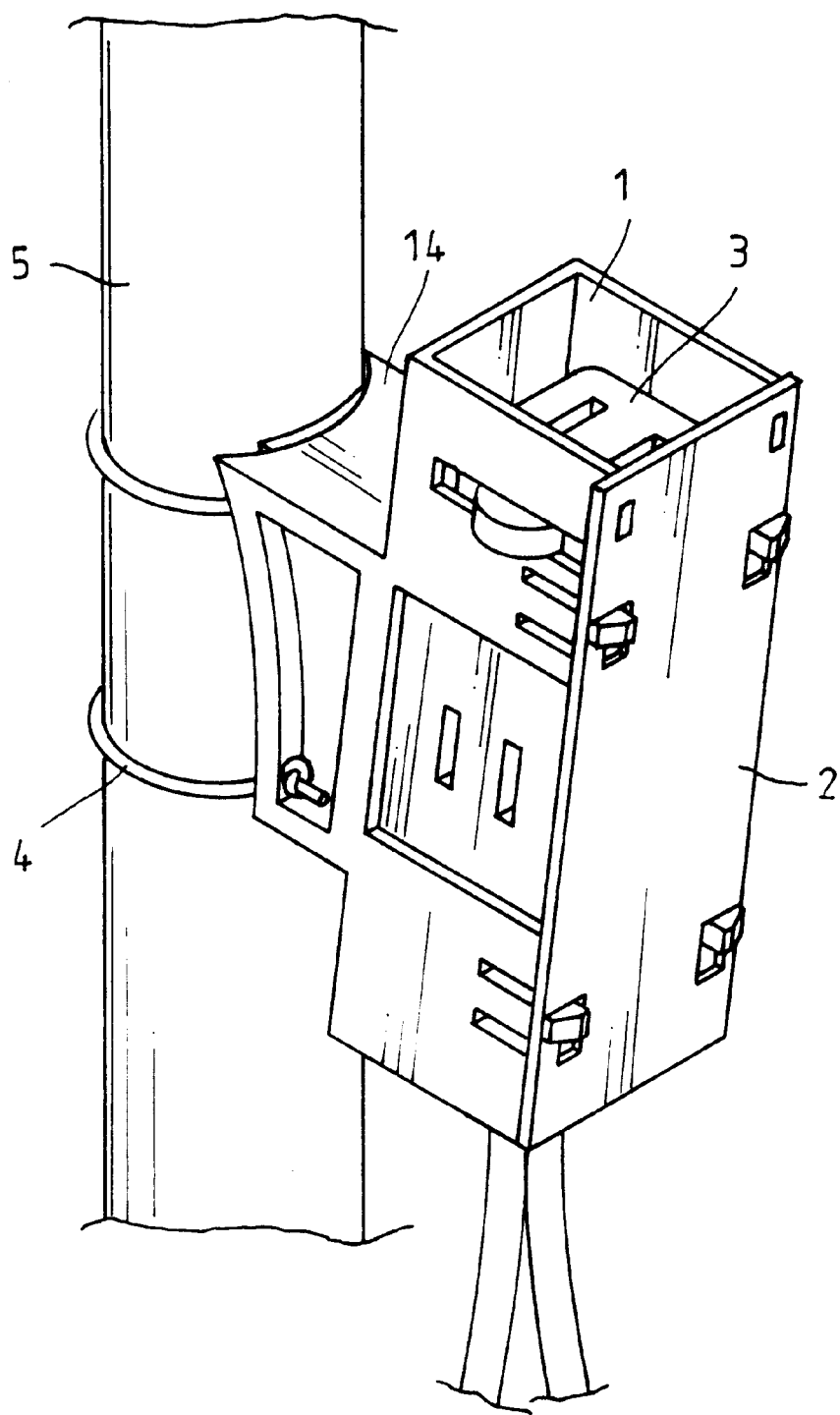
FIG. 3 is a three dimensional diagram of an assembling structure of the present invention.

Please refer to FIGS. 1 to FIG. 3, the present invention mainly is to design a fixing seat structure(1), which is a U-shaped body with opposed clip-assembled hooks(11) mounted on its two sides to simply and easily clip-assemble with corresponding clip-assembling holes(21) of a clip-assembling cover plate(2) to form a firm assembling structure. Two sides of the fixing seat(1) are mounted with positioning groove(12) and notch groove(13) to align the positioning groove(1) with a positioning flange(31) of socket side edges of an extension cord socket(3), such that the socket(3) is clip-controlled by a fixing seat(1) and cover plate(2), connected and combined as a whole body, while the insert holes located at two sides and upper end of the socket are kept under external exposing status.

A connecting seat(14) is mounted on a back side of the fixing seat(1). An outer edge of the connecting seat is set as an inclined and inwardly concave arc surface(141) and mounted with connecting holes(142) at both ends. While connecting as shown is FIG. 3, by utilizing the rope(4) to pass through the connecting holes(142) to let the inwardly concave arc surface(141) stick to the artificial trunk(5) of Christmas tree, it is able to easily attach the fixing seat(1) and socket(2) to the trunk(5) side, and is provided with a safe and firm effect.

Figure 4:
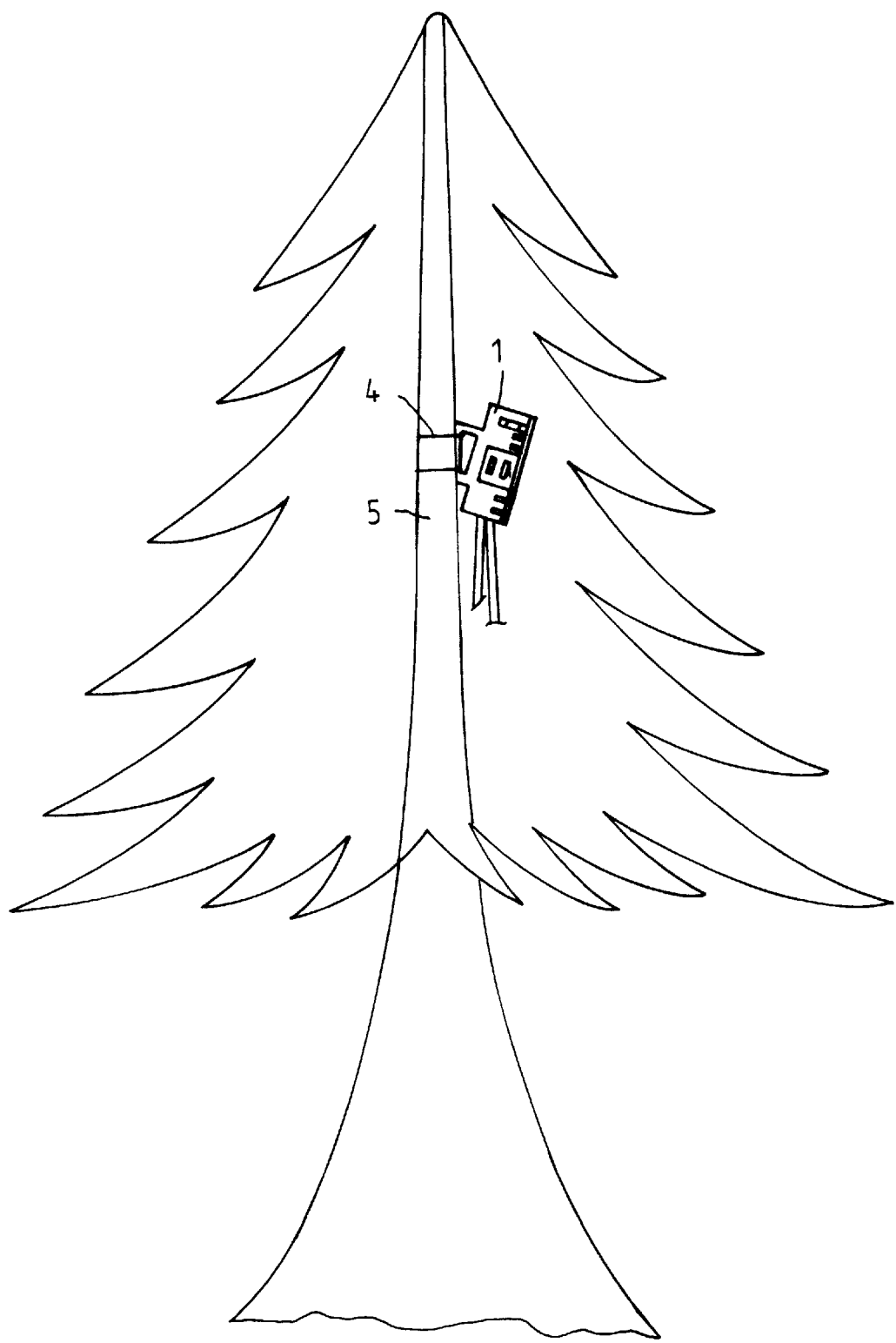
FIG. 4 is a schematic diagram of an application example of the present invention.

Thus, as shown in FIG. 4, it shows an inclined angle between the socket(2) and trunk(5) after an assembly of the present invention. Therefore, it is very convenient for the users while operating the connection between the plug and socket. And, insert holes of the top edge also can provide an easy usage because they have an inclined angle.

In general, the characteristics of the present invention is to design a assembling structure which can be easily, simply and firmly set to the trunk of artificial Christmas tree, and can be connected effectively with a socket of the extension cord to obtain an easy and safe usage. And, it also can simultaneously provide the conducting connection of multiple sets of lamp strings. This first invented structure is provided with the expected purpose of improving effectiveness, and is able to fit with the positive conditions for patent. Thus we file the application according the law.

What is claimed is:

1. A safety fixing structure of an extension cord for artificial Christmas tree includes fixing seats mounted with opposed clip-assembling hooks at both sides to simply and easily clip-assemble with corresponding clip-assembling holes of a clip-assembling cover plate; two sides of the fixing seat are mounted with positioning groove and notch groove to align the positioning groove with a positioning flange in socket side edges of an extension cord socket, such that the socket is clip-controlled by a fixing seat and cover plate, connected and combined as a whole body, while the insert holes located at two sides and upper end of the socket are kept under external exposing status; a connecting seat is mounted on a back side of the fixing seat, an outer edge of the connecting seat is set as an inclined and inwardly concave arc surface and mounted with connecting holes at both ends; by utilizing the rope to pass through the connecting holes to let the inwardly concave arc surface stick to the trunk of artificial Christmas tree, it is able to easily attach the fixing seat and socket to the trunk side such that forms a inclined angle between the socket and trunk.

* * * * *